United States Patent
Mayr

(10) Patent No.: US 7,562,625 B2
(45) Date of Patent: Jul. 21, 2009

(54) APPARATUS AND METHOD FOR GENERATING AN ELECTRIC CURRENT FOR A PRESS CYLINDER

(75) Inventor: Peter Mayr, Todtenweis (DE)

(73) Assignee: MAN Roland Druckmaschinen AG, Augsburg (DE)

( * ) Notice: Subject to any disclaimer, the term of this patent is extended or adjusted under 35 U.S.C. 154(b) by 440 days.

(21) Appl. No.: 11/233,260

(22) Filed: Sep. 22, 2005

(65) Prior Publication Data

US 2006/0070535 A1    Apr. 6, 2006

(30) Foreign Application Priority Data

Sep. 22, 2004    (DE)    ........................ 10 2004 045 832

(51) Int. Cl.
    *B41F 1/34*    (2006.01)
(52) U.S. Cl. ...................................... 101/480; 101/479
(58) Field of Classification Search .................. 101/479, 101/480
    See application file for complete search history.

(56) References Cited

U.S. PATENT DOCUMENTS 4,663,536 A * 5/1987 Roesel et al. .................. 290/7
5,115,738 A * 5/1992 Grutzmacher et al. ........ 101/216
5,808,465 A * 9/1998 Gentile et al. .......... 324/207.17
6,178,884 B1 * 1/2001 Weschenfelder ............ 101/247
6,420,807 B1 * 7/2002 Tsujimoto et al. ............. 310/83
7,173,356 B2 * 2/2007 Krueger et al. .............. 310/112

FOREIGN PATENT DOCUMENTS

| DE | 27 21 415 A1 | 12/1977 |
| DE | 41 29 373 A1 | 3/1993 |
| DE | 41 29 827 A1 | 3/1993 |
| DE | 42 22 827 A1 | 1/1994 |
| DE | 44 08 719 C1 | 7/1995 |
| DE | 296 19 491 U1 | 12/1996 |
| DE | 100 58 758 A1 | 5/2002 |
| DE | 203 12 301 U1 | 11/2003 |
| DE | 103 42 739 A1 | 4/2004 |

* cited by examiner

*Primary Examiner*—Anthony H. Nguyen
(74) *Attorney, Agent, or Firm*—Crowell & Moring LLP

(57) ABSTRACT

A press cylinder having at least one drivable device and having a generator assigned to the press cylinder for generating electrical energy for actuating the drivable device is disclosed. A generator housing of the generator is permanently connected to the press cylinder and rotates with the press cylinder. A generator rotor belonging to the generator and enclosed by the generator housing rotates relative to the generator housing, and it being possible for the generator rotor to be driven by an electric motor.

17 Claims, 1 Drawing Sheet

APPARATUS AND METHOD FOR GENERATING AN ELECTRIC CURRENT FOR A PRESS CYLINDER

This application claims the priority of German Patent Document No. 10 2004 045 832.4, filed Sep. 22, 2004, the disclosure of which is expressly incorporated by reference herein.

BACKGROUND AND SUMMARY OF THE INVENTION

The invention relates to a press cylinder.

Presses have a plurality of cylinders into which electrically drivable or electrically operable devices are integrated. Examples which may be mentioned here are the folding jaw cylinder of a press folding unit, into which electrically drivable or operable folding jaws are integrated. As a further example, mention may be made of a plate cylinder of a printing unit of a press, it being possible for electrically drivable or electrically operable clamping devices for printing plates to be integrated into such plate cylinders.

In order to drive or operate the devices integrated into the press cylinder, electrical energy or an electric current is needed, which is generated by a generator assigned to the respective press cylinder. According to the prior art, the electric current generated by the generator is introduced into the rotating press cylinder via slip rings in order to be able to operate the drivable devices with the current introduced in this way. However, the introduction of current into rotating press cylinders via slip rings has the disadvantage that the slip rings are susceptible, and therefore the reliability of the folding jaws or pins is not ensured. The introduction of current into rotating press cylinders via slip rings is accordingly disadvantageous overall.

On this basis, the present invention is based on the problem of providing a novel type of press cylinder.

According to the invention, a generator housing of the generator is permanently connected to the press cylinder and rotates with the same, a generator rotor belonging to the generator and enclosed by the generator housing rotating relative to the generator housing and it being possible for the generator rotor to be driven by an electric motor.

In the sense of the present invention, it is provided to connect the generator housing of the generator permanently to the rotating press cylinder, so that the generator housing rotates together with the press cylinder. As a result of the rigid connection of the generator housing to the press cylinder, the current generated by the generator can be introduced into the rotating press cylinder without any difficulty. There is no relative movement between the generator housing and the press cylinder, so that it is possible to dispense with components moved relative to one other in order to introduce current into the press cylinder. This increases the reliability of the introduction of current into the press cylinder and the generator has to be serviced less frequently.

The rotational speed of the electric motor and therefore of the generator rotor can preferably be matched to the rotational speed of the press cylinder in such a way that the generator generates an electric current with a constant frequency.

According to an advantageous development of the present invention, at least one closed-loop or open-loop control device for the, or each, drivable device that is integrated into the press cylinder is integrated into the press cylinder, the, or each, closed-loop or open-loop control device being supplied with electrical energy by the generator, and the, or each, closed-loop or open-loop control device integrated into the press cylinder exchanging data without contact with a closed-loop or open-loop control device of other press cylinders or with a central closed-loop or open-loop control device.

BRIEF DESCRIPTION OF THE DRAWINGS

Preferred developments of the invention emerge from the following description. An exemplary embodiment of the invention will be explained in more detail, without being restricted hereto, by using the drawing, in which.

DETAILED DESCRIPTION OF THE DRAWINGS

Figure 1:
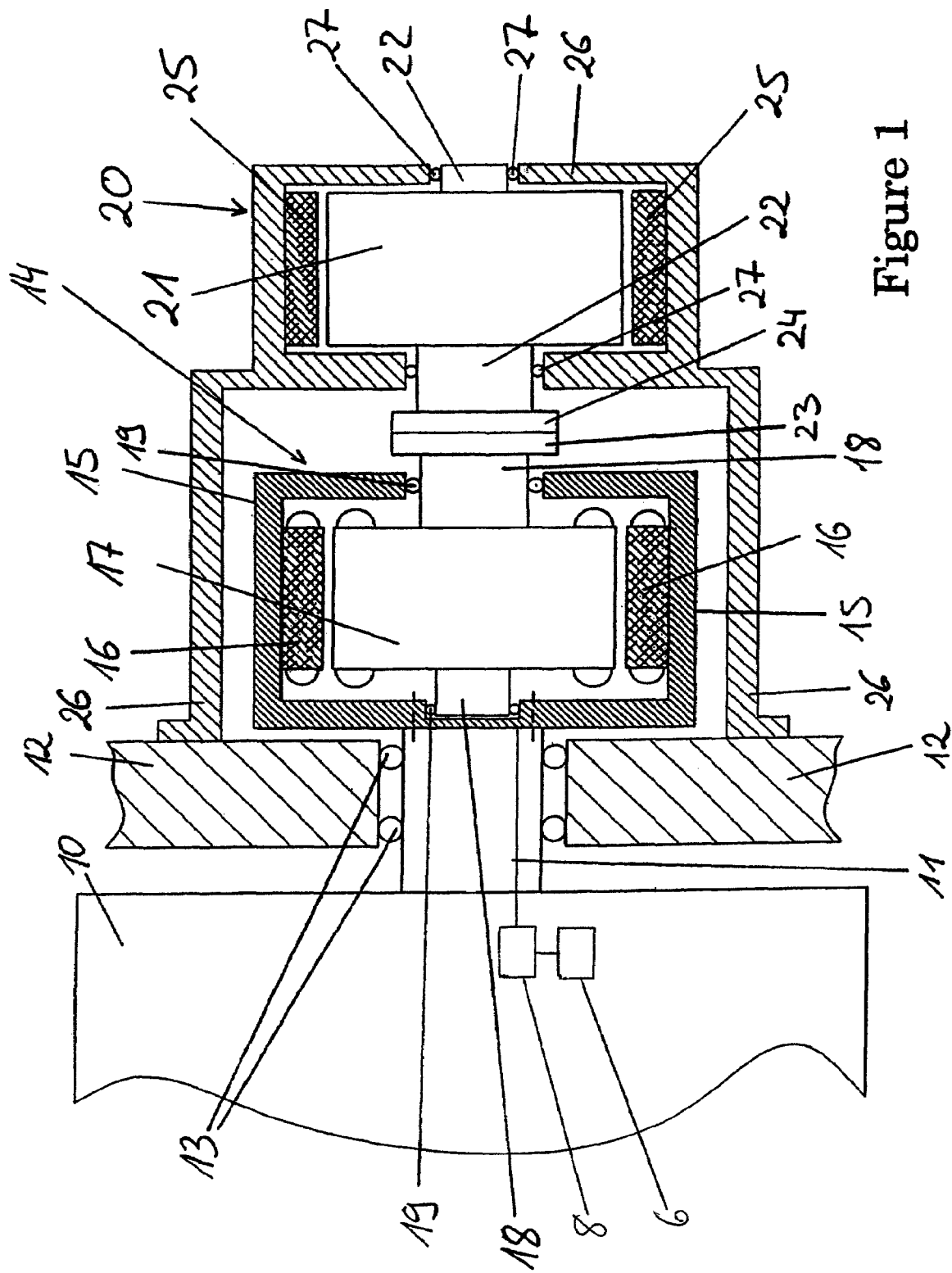
FIG. 1 shows a schematic extract from a press cylinder according to the invention.

In the following text, the present invention will be described in greater detail with reference to FIG. 1. FIG. 1 shows as a detail a press cylinder 10, a shaft 11 of the press cylinder 10 being mounted on a stationary framework 12. The press cylinder 10 and its shaft 11 rotate with respect to the stationary framework 12, a bearing 13 for mounting the shaft 11 of the press cylinder 10 being integrated into the framework 12.

At least one drivable device, schematically illustrated in FIG. 1 and indicated by reference number 6, is integrated into the press cylinder 10. In the case in which the press cylinder 10 is designed as a folding jaw cylinder of a press folding unit, a plurality of drivable devices designed as folding jaws are integrated into the press cylinder. On the other hand, if the press cylinder 10 is designed as a pin cylinder of a press folding unit, then the drivable devices integrated into the press cylinder are pins and folding blades. On the other hand, if the press cylinder 10 is designed as a plate cylinder, then the drivable devices integrated into the press cylinder can be a clamping system for printing plates.

Irrespective of the actual implementation of the press cylinder 10, electrical energy, in particular an electric current, must be provided to drive or operate the devices integrated into the press cylinder 10. To this end, a generator 14 is assigned to the press cylinder 10.

In the sense of the present invention, it is provided to connect a generator housing 15 of the generator 14 permanently to the shaft 11 of the press cylinder 10 in such a way that the generator housing 15 rotates together with the press cylinder 10. Accordingly, during operation the rotational speed of the generator housing 15 corresponds to the rotational speed of the shaft 11 and the rotational speed of the press cylinder 10. As can be gathered from FIG. 1, generator windings 16 are assigned to the generator housing 15 permanently connected to the shaft 11 and the press cylinder 10.

The generator housing 15 encloses a generator rotor 17 of the generator 14, the generator rotor 17 rotating relative to the likewise rotating generator housing 15. The rotational speed of the generator rotor 17 is in this case higher than the rotational speed of the generator housing 15. As can be gathered from FIG. 1, a shaft 18 of the generator rotor 17 is rotatably mounted in the generator housing 15 via bearings 19.

The generator rotor 17 is driven by an electric motor 20. As FIG. 1 shows, an electric motor rotor 21 of the electric motor 20 is coupled via a shaft 22 to the shaft 18 of the generator rotor 17, specifically via appropriate shaft flanges 23 and 24. The electric motor rotor 21 can be rotated with respect to a stator 25 of the electric motor 20, the stator 25 being positioned in a housing 26. As can be gathered from FIG. 1, the shaft 22 of the electric motor rotor 21 is rotatably mounted in the housing 26 via bearings 27. The housing 26 acts on the framework 12 and is designed to be stationary, just like the framework 12.

In accordance with the design principle described above, the electric motor 20 drives the generator rotor 17, the generator rotor 17 rotating with respect to the generator housing 15 rotating together with the press cylinder 10. As a result of the fact that the rotational speed of the generator rotor 17 is higher than the rotational speed of the generator housing 15, the generator 14 generates an electric current which, as a result of the rigid attachment of the generator housing 15 to the press cylinder 10, can be introduced into the latter without components moved relative to the press cylinder 10. This results in a maintenance-free generator for generating and introducing an electric current into the press cylinder 10 to actuate or drive the devices integrated into the press cylinder 10.

In the sense of the present invention, in order to provide a current with a constant frequency irrespective of the rotational speed of the press cylinder 10 and therefore the rotational speed of the generator housing 15, it is provided to drive the electric motor 20 and therefore the generator rotor 17 as a function of the rotational speed of the press cylinder 10. Accordingly, if, starting from a rotational speed, the rotational speed of the press cylinder 10 and therefore the generator housing 15 is increased, then, in the sense of the present invention, in order to maintain the relative speed or the relative rotational speed between the generator housing 15 and the generator rotor 17, the rotational speed of the electric motor 20 and therefore of the generator rotor 17 is increased accordingly. On the other hand, if the rotational speed of the press cylinder 10 and therefore of the generator housing 15 is reduced, the rotational speed of the electric motor 20 and therefore of the generator rotor 17 is also reduced. In this way, it is accordingly possible to provide an electric current with a constant frequency.

According to another advantageous development of the present invention, it is proposed to integrate at least one closed-loop or open-loop control device into the press cylinder 10 for the, or each, drivable device integrated into the press cylinder 10. This makes it possible to construct each press cylinder 10 as an autonomously operating cylinder. Such a closed-loop or open-loop control device is schematically represented in FIG. 1 and is indicated by reference number 8.

For example, a closed-loop control device can be integrated into the press cylinder 10, which device is supplied with electric current by the generator 14 and which performs the closed-loop or open-loop control of all the devices integrated into the press cylinder 10. Here, it is within the spirit of the present invention for the closed-loop or open-loop control device integrated into the press cylinder 10 to exchange data without contact with a closed-loop or open-loop control device integrated into another press cylinder or with a central closed-loop or open-loop control device, means for the non-contact, preferably optical or electromagnetic, exchange of data then being integrated into the respective control devices for this purpose. By this means, it is possible in a straightforward manner, for example to define new set points for the driving of the devices integrated into the press cylinder to an open-loop or closed-loop control device integrated into the press cylinder 10. In this case, these can be, for example, set points for driving the pins, folding blades, folding jaws or else printing plate clamping systems, depending on whether the press cylinder according to the invention is designed as a pin cylinder or folding jaw cylinder of a press folding unit or as a plate cylinder of a printing unit of a press.

LIST OF REFERENCE SYMBOLS

10 Press cylinder
11 Shaft
12 Framework
13 Bearing
14 Generator
15 Generator housing
16 Generator winding
17 Generator rotor
18 Shaft
19 Bearing
20 Electric motor
21 Electric motor rotor
22 Shaft
23 Shaft flange
24 Shaft flange
25 Stator
26 Housing
27 Bearing The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A press cylinder arrangement having a drivable device and comprising:
    a press cylinder,
    a generator assigned to the press cylinder for generating electrical energy, and
    an electric motor including an electric motor rotor,
    wherein the generator includes a generator housing, which is disposed externally of, permanently connected to, and rotatable with the press cylinder, generator windings assigned to the generator housing, and a generator rotor, which is enclosed by and rotatable relative to the generator windings and the generator housing, and
    wherein the generator rotor is fixed to said electric motor rotor for rotation with said electric motor rotor so as to be drivable by said electric motor relative to the generator windings and the generator housing.

2. The press cylinder arrangement according to claim 1, wherein the press cylinder includes a shaft, and wherein the generator housing is permanently connected to the shaft of the press cylinder.

3. The press cylinder arrangement according to claim 1, wherein the generator housing and the generator windings rotate together with both the generator housing and the press cylinder.

4. The press cylinder arrangement according to claim 1, wherein a rotational speed of the electric motor and the generator rotor is matchable to a rotational speed of the press cylinder in such a way that the generator generates an electric current with a constant frequency.

5. The press cylinder arrangement according to claim 1, wherein the generator rotor rotates relative to the generator housing in such a way that a rotational speed of the generator rotor is higher than a rotational speed of the generator housing.

6. The press cylinder arrangement according to claim 1, wherein a closed-loop or open-loop control device for the drivable device is integrated into the press cylinder.

7. The press cylinder arrangement according to claim 6, wherein the closed-loop or open-loop control device is supplied with electrical energy by the generator.

8. The press cylinder arrangement according to claim 6, wherein the closed-loop or open-loop control device provides for data exchange without contact.

9. The press cylinder arrangement according to claim 7, wherein the closed-loop or open-loop control device provides for data exchange without contact.

10. The press cylinder arrangement according to claim 9, wherein the data exchange is provided by way of optical technology.

11. The press cylinder arrangement according to claim 9, wherein the data exchange is provided by way of electromagnetic technology.

12. The press cylinder arrangement according to claim 1, wherein an electric motor rotor is coupled to the generator rotor.

13. The press cylinder arrangement according to claim 12, wherein the electric motor rotor includes a shaft that is coupled to a shaft of the generator rotor.

14. The press cylinder arrangement according to claim 1, wherein the press cylinder is designed as part of a press folding unit, for which the generator generates electrical operating energy.

15. The press cylinder arrangement according to claim 2, wherein the press cylinder is designed as a part of a press folding unit, for which the generator generates electrical operating energy.

16. The press cylinder arrangement according to claim 1, wherein the press cylinder is designed as a part of a printing unit, for which the generator generates electrical operating energy.

17. The printing apparatus according to claim 14, wherein the press cylinder includes a shaft and wherein the generator housing is fixedly coupled to the press cylinder shaft.

* * * * *